May 19, 1936.  F. R. HIGHT  2,041,657
METHOD FOR MAKING SPOKED WHEELS
Original Filed Feb. 16, 1933   3 Sheets-Sheet 1
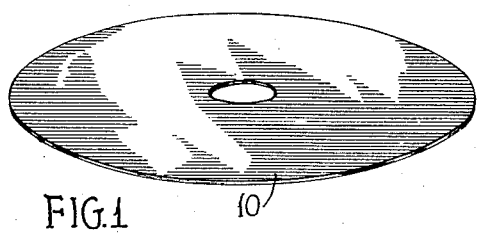
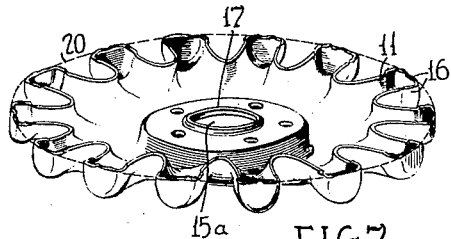
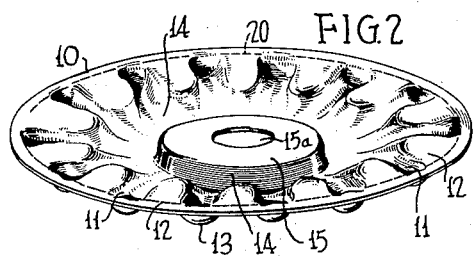
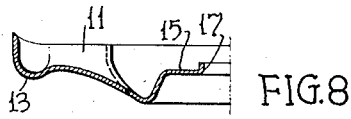
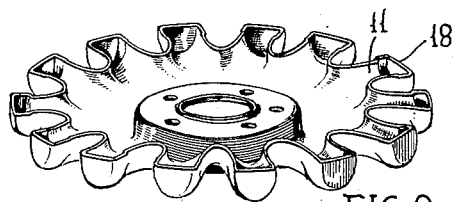
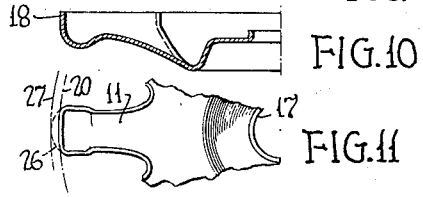
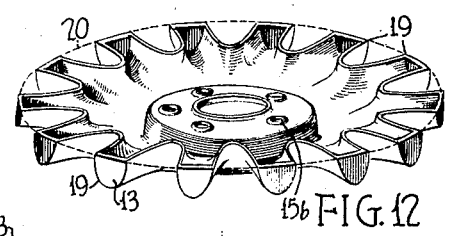
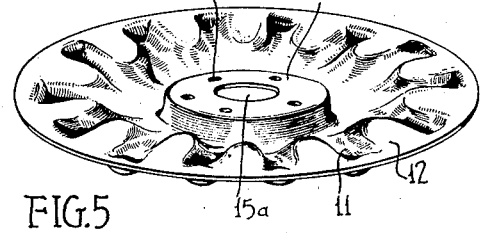
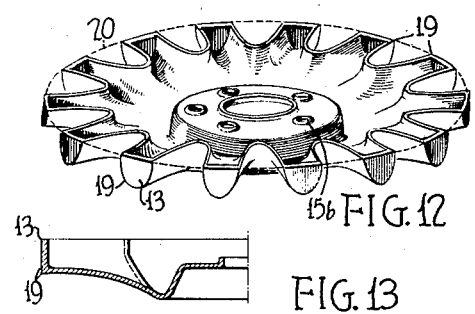
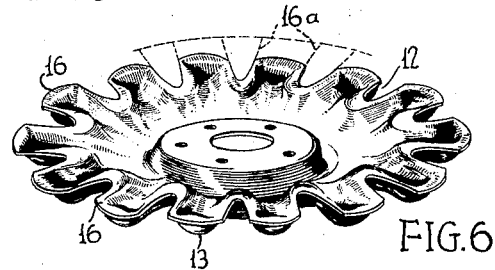
INVENTOR
FRANKLIN R. HIGHT.
BY
ATTORNEY.

May 19, 1936.  F. R. HIGHT  2,041,657
METHOD FOR MAKING SPOKED WHEELS
Original Filed Feb. 16, 1933  3 Sheets-Sheet 2

INVENTOR
FRANKLIN R. HIGHT.
BY
ATTORNEY.

May 19, 1936.  F. R. HIGHT  2,041,657
METHOD FOR MAKING SPOKED WHEELS
Original Filed Feb. 16, 1933   3 Sheets-Sheet 3

INVENTOR
FRANKLIN R. HIGHT
BY
ATTORNEY.

Patented May 19, 1936

2,041,657

UNITED STATES PATENT OFFICE 2,041,657

METHOD FOR MAKING SPOKED WHEELS

Franklin R. Hight, Detroit, Mich., assignor to Budd Wheel Company, Philadelphia, Pa., a corporation of Pennsylvania Application February 16, 1933, Serial No. 657,060
Renewed March 28, 1936

12 Claims. (Cl. 29—159.03)

This invention relates to metallic vehicle wheels and, more particularly, to a method for making spoked metallic vehicle wheels.

The method of my invention is peculiarly adapted for the formation of the bodies of artillery steel wheels for automobile use, but it may well prove that it has adaptation to wheels of other character, such for example, as railway wheels, pulleys and the like.

In the formation of artillery steel wheels for automobiles the stock used is relatively flat sheet stock of steel. Sometimes this stock is of uniform gauge and sometimes of a tapering gauge. In all cases the gauge is relatively light gauge as compared with that of the plate used in wheels of extremely heavy weight since the automobile wheel needs be as light as possible consistent with the durability and strength in order to improve the riding qualities of the vehicle. The utilization of this light gauge steel introduces very peculiar problems of fabrication.

One of the outstanding objects of the invention is the attainment of extremely deep draws by means of which the wheel may be given the extremely high section modulus in the diametral plane by which the wheel is afforded added strength and further decreased weight and by means of which many spokes of axially deep cross section may be utilized. At the same time attainment of the very deep draw and irregular contour renders the nave and body of the wheel a field of great variety of highly pleasing designs and gives a high degree of ornamental value.

Another object is the variety shaping of the spoke ends to forms other than the round corners which ordinarily accompany a drawing operation, whereby recessed and unsightly joints with the rim may be avoided, and such joints may be given neat and ornamental appearance of wide variety.

Another object is the attainment of simplicity and cheapness under the high requirements of strength and lightness and the great variety of forms imposed by ornamental design.

A still further object consists in providing a method in which a wide range of adaptation of method to different constructions and designs, involving few or numerous spokes, especially numerous spokes, and naves of relatively very great depth as compared with the depth of the spokes in axial cross section, is obtained.

The method of my invention constitutes the solution of these and other problems and has been found applicable to the efficient drawing and accurate formation of numerous forms of these wheels.

In brief, the method consists in initially but partly forming the body of the wheel from the flat sheet stock with web connected spokes having oversized ends, then blanking out portions of the webs between the spokes to leave marginal web portions flanking the walls of the spokes so formed, annealing the blank in this condition, then turning the marginal web portions into the planes of the partly formed side walls to axially deepen the same to fuller cross section, and thereupon reducing the enlarged ends of the spokes by an upsetting operation or its equivalent to bring them to dimension, to thicken the walls thereof, to square or otherwise shape up the external corners, and to true up the ends to fit into a wheel rim.

The best forms of my invention now known to me are illustrated in the accompanying drawings in which—

Figure 1 is a perspective view of a blank 10 of flat stock sheet metal of thin gauge, in this instance of circular form.

Figure 2 is a similar perspective of such a flat sheet stock blank 10 in which the spokes 11 have been axially pressed partly to axial depth and are interconnected by webs 12 of the stock.

Figure 3 shows a plan view of a sector of the blank illustrated in Fig. 2.

Figure 4 is a section in an axial plane on line 4—4 of Fig. 3.

Figure 15:
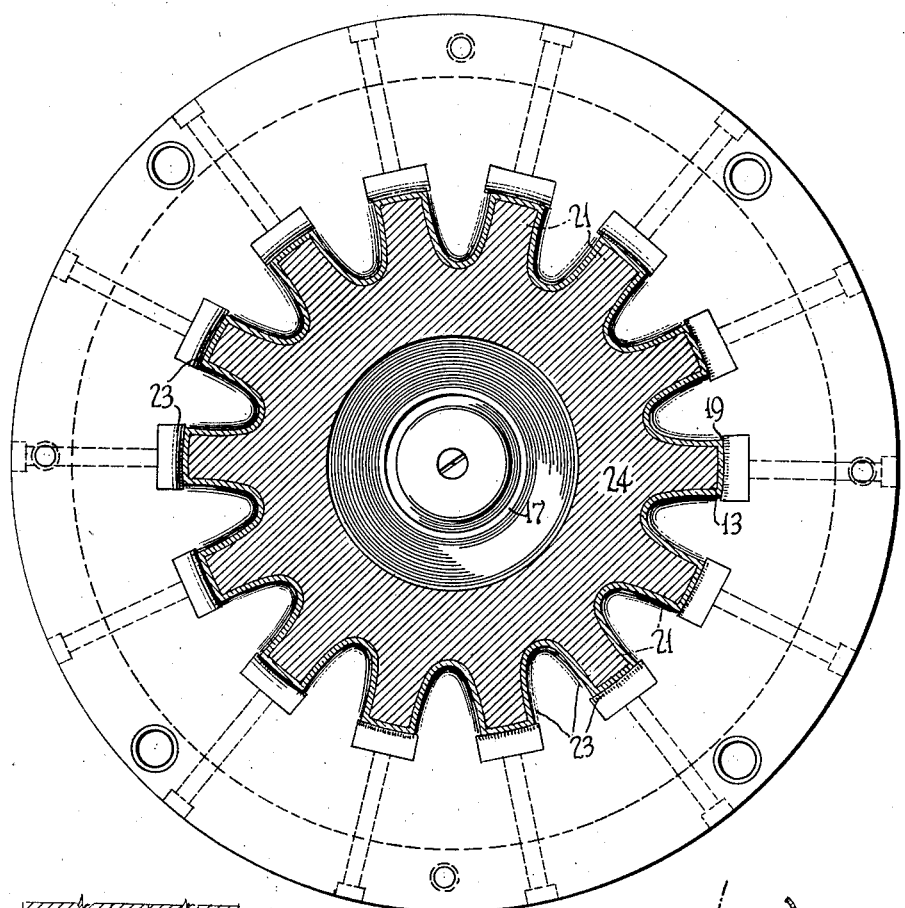

Figure 5 shows in perspective the blank subjected to the former treatment and provided with holes 15b pierced in its central flange 15, and the central aperture 15a as marginally trimmed to true concentricity with the circle of holes 15b.

Figure 6 is another perspective view of the same blank in which portions of the webs 12 interconnecting the spokes have been blanked out between the spokes to leave laterally projecting margins 16 all around, which margins are of sufficient width when turned into the planes of the walls of the spokes to enable the completion of the depth of axial cross section of the same.

Figure 7 shows the spoked wheel body following the turning of the margins 16 into the planes of the side walls of the spokes in the completion of the axial depth of cross section of the spokes.

Figure 8 is an axial section centrally of the spokes of this blank in the condition of Fig. 7.

Figure 9 is a perspective of the wheel body showing the edges 18 of the spoke shorn of their irregularities by a trimming operation.

Figure 10 is an axial cross section through the center of one of the spokes for comparison with Fig. 8.

Figure 11 is a plan view of this spoke indicating in conjunction with Fig. 10 its continuing oversized end.

Figure 12 is a perspective of the wheel body after the oversized end walls have been upset to reduce them to their desired cross section, to thicken their end walls, and to sharpen the corners 19. The bolt holes 15b have also been coined in this operation.

Figures 13 and 14 are respectively axial cross sections in the plane of one of the spokes of Fig. 12 showing by comparison with Figs. 10 and 11 the reduction of the ends 13 of the spokes to the form and dimensions desired.

Figure 17:
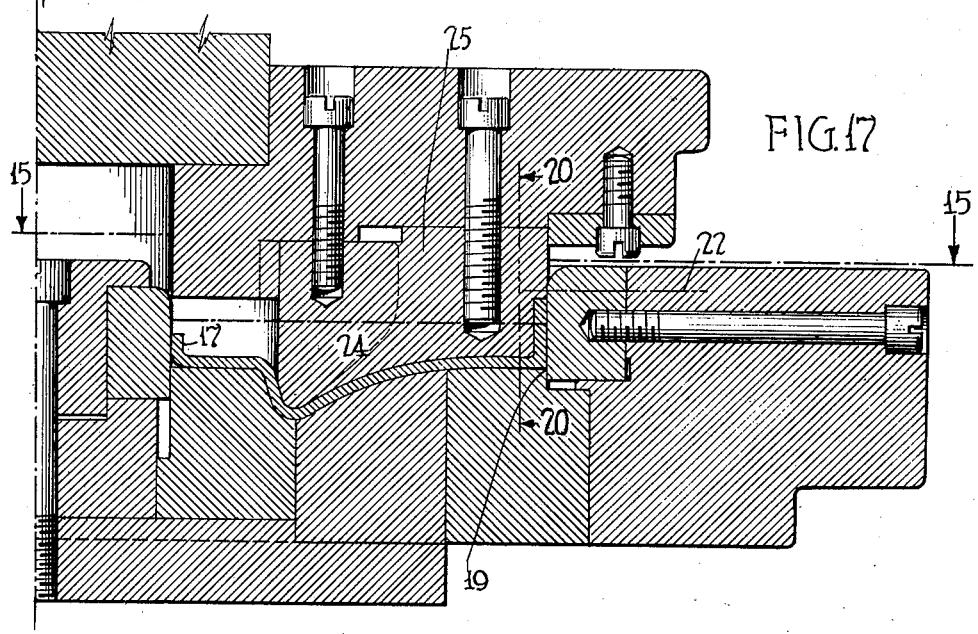

Figure 15 shows in sectional transaxial plane the dies used to carry out the operation illustrated in Figs. 12 to 14, the section being taken on line 15—15 of Fig. 17.

Figure 16:
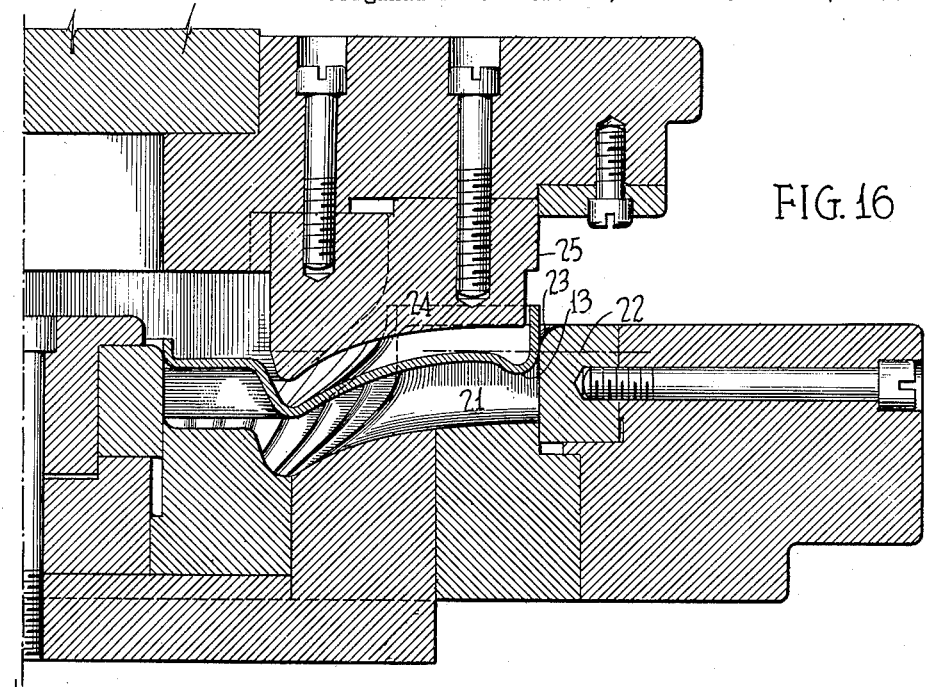

Figure 16 is an axial cross section of the die parts used in connection with one spoke separated from each other and the work in place.

Figure 17 is a similar view showing the die parts closed upon each other and the work.

Figure 18:
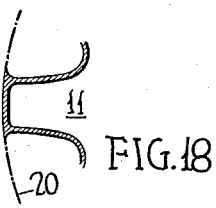

Figure 18 shows in elevation one of the many variations in spoke end form which my invention renders possible.

Figure 19:
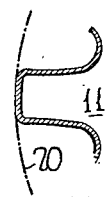

Figure 19 shows similarly the rounded corner form, the only one I have known to be feasible prior to my invention.

Figure 20:
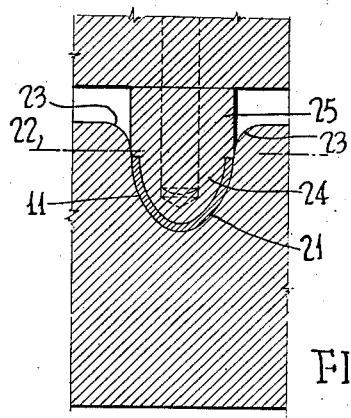

Figure 20 is a section on line 20—20 of Fig. 17.

Figure 21:
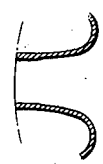

Figure 21 is a plan view of an open ended spoke made according to my invention.

All of the operations illustrated in these figures are or may be performed on ordinary die presses. The part forming operations illustrated in Figs. 2, 3 and 4 are pure die drawing operations.

It is to be noted that the sheet stock extends peripherally beyond the ends 13 of the spokes. These ends 13 are bulged out to an oversized dimension whereas the bodies of the spokes 11 are in their body portions so far as formed, substantially of final dimension. The nave 14 and bolting-on flange 15 are also formed in the operation of Figure 2. In Figure 4, the ends 13 are indicated as bulged out in the bottom as well as the side walls. The great depth of the draw in the bodies of the spokes and the still greater depth of the draw in the nave portion of the wheel is intended to be shown in Figure 4 in conjunction with Figures 3 and 2. Figures 3 and 2 show also the well rounded corners of the draw where it joins the webs 12 intervening and the nave portion of the wheel stamping. Through and by virtue of the relatively incomplete depth of the spoke formations thus constituted as compared with the depth of cross section of the spokes of the completed wheel body appearing in subsequent figures, together with the well rounded joinder of these cross sections with the webs 12 as aforesaid, the augmentation of the number of spokes of the wheel with resultant increase in acuteness of the angles between the spokes, and the augmentation of the greatest depth of draw of the nave portion of the wheel may be achieved over very wide range, thus multiplying the variety of structural and design embodiments of which the wheel is susceptible. The complete depth forming illustrated in Fig. 7 is a combined bending and drawing operation. It will be observed that the side walls so bent or turned are somewhat uneven. It will be observed further that there has been formed about the aperture 15a in this operation the central flange 17 which is a part of the hub seating or the flange strengthening means. The final end forming operations illustrated in Figs. 12, 13 and 14 are combined bending, drawing and upsetting operations in which the upsetting action is the principal action.

The hole piercing and margin blanking operations illustrated in Figs. 5 and 6 and the trimming operations illustrated in Figs. 9, 10 and 11 are die cutting operations.

The notching operation of Fig. 6 and the end trimming operation of Fig. 9 may be combined in one operation by a margin blanking die operation of Fig. 6 affording the upturned edge outline of Fig. 9. However, by having the margin blanking and end trimming operations separate, one set of dies may be used for wheel bodies of different diameter and different spoke length merely by carrying out the margin blanking operation with an overlength notching die, the notching portions of which have the form shown in dotted lines 16a in Fig. 6.

Figure 8, being an axial section centrally of the spokes of the blank in the condition of Figure 7, emphasizes two things; the fact that the spoke ends are still oversized and that the edges 18 of the walls of the spoke are irregular. The degree of irregularity will vary, of course, with the nature of the draw and the accuracy with which the margins 16 are cut. With certain draws and with certain margins 16, the edges may be quite regular. Figure 8 is to be compared with Figure 4 to obtain an idea of the markedly greater ultimate depth of axial cross section of the spokes as compared with the incomplete depth of the wheel in the stage illustrated in Figure 4. If this full ultimate depth illustrated in Figure 8 were attempted in the operations of Figure 4, and while it might be achieved with certain special steels, nevertheless breakage might result. The multi-stage process of my invention not only affords considerably greater guarantee against breakage and of a better quality of stamping, but also guarantees a greater range in structural and design adaptations.

Intermediate the operations of Figs. 6 and 7 or intermediate the operations of Figs. 7 and 9 as may be preferred, but preferably the former, the blank is annealed whereby the further work upon it as carried out in Figs. 7 to 14 may be done without undue deterioration of the metal. This is an especially important step where the depth of draw is extreme, where the number of spokes is great, and where the apices of the angles which the walls of adjacent spokes make with each other are somewhat sharp.

The forming and cutting dies by which these operations are performed are believed to need no illustration in connection with the operations illustrated in Figs. 1 to 11 inclusive in that they are designed along the lines of common practice in drawing and cutting dies. On the other hand, the dies used for the end upsetting operations of Figs. 12 to 14 are of a very special kind invented for this purpose. They are illustrated in Figs. 16 and 17.

The female die comprises a number of spoke end forming pockets 21 of the form (in their bottom portions lying below the plane 22) of the final dimension desired for the outer ends of the spokes. Above the plane 22, however, these pockets are provided with a flare 23 all around the region of the enlarged end 13 of the spoke 11 adapted to receive and enter by convergence of side walls the enlarged ends 13 when in the condition of Figs. 9 to 11.

The male portion of the die is provided with a portion 24 which when the dies are together, lies below the plane 22 and conforms precisely to the interior dimensions of the spoke as desired in final form. Above the plane 22, however, it is provided with a series of upsetting blocks 25, one for each spoke end, of a dimension overlapping the transaxial edges of the spoke end side and end walls as clearly shown in Figs. 16, 17 and 20, whereby these side and end walls are engaged as the dies come together upon the inserted blank of the form of Figs. 9 to 11 (as shown in Fig. 17) and the blank is forced home to the forming and dimensioning pockets 21. In such forcing home, the oversized end walls are first moved by a combined bending and drawing operation and finally by a powerful upsetting operation whereby the walls are upset and thickened and the metal is forced into the corners of the pockets 21 to sharpen the corners of the end of the spoke, the walls are compacted and strengthened and the spoke ends reduced precisely to the form and dimension desired. Contrast this perfect spoke end with the old form shown in Fig. 19.

Now that more complete understanding of the apparatus and the method is had, attention is called to a further feature involving the final diameter as indicated by the circle 20 of Fig. 12. The operation of sizing, illustrated in Figs. 12 and 14, as carried out by the dies of Figs. 15 and 17, reduces the spider precisely to the final dimension desired for insertion into a wheel rim and accurately seating thereon within such tolerances as required for tight fits, etc. It is a part of my invention that this final diameter shall be sensibly preserved in each and all of the drawing operations prior to the final operation of Figs. 12 to 14. This I have indicated in Fig. 2 by incorporating in that figure the circle 20. The idea is, while the spoke end walls are but imperfectly formed, they conform in general to the diameter of the same circle 20 which appears in Fig. 12. The thickening and strengthening of the ends and adjoining walls of the spokes and the sharpening and thickening of the corners 19 of Figures 13 and 14, show by comparison with Figures 10 and 11, the reduction of the ends 13 of the spokes to the form and dimensions desired, and by conformity to the dotted line 20 representing the rim periphery, the arcuate form of the end walls of the spokes, corresponding to the arcuate form of the inner periphery of a rim.

Figure 14 and the preceding Figures 8 to 13 each and all show clearly how regularity of spoke cross sectional outline and sharpness of inward spoke boundaries are brought into the final product in relatively great depth of axial cross section of the spokes and nave as compared with the relatively shallow cross sections and indefinite outlines in the intermediate stages illustrated in Figures 2 to 6.

Similarly, in Fig. 7 I have indicated this circle 20 and in this figure it is apparent that the conformance of the end walls per se is still closer to this circle. This has the advantage of avoiding over work on the end walls themselves as distinguished from the side walls adjoining the end walls. Thus the toughness of the end walls is preserved as an aid in the security of the fastening means of the spoked wheel body to the rim. In other words, the end walls are finally completed without brittleness or other imperfection which would cause them to crack or break and thus impair the securement of the body to the rim.

However, in certain classes of steels, and in instances where the wheel body after being completed under the operations of Figs. 12 to 14 is normalized, such conformance of the drawing operations to the ultimate circle 20 may be departed from. The nature of such a departure is illustrated with reference to Fig. 11 by the dotted line 26 indicating the possible bulging out of the end wall of the spoke 11 beyond the diameter of the outermost circle 20, a bulging out to the diameter of a preliminary circle 27. Such a bulged out wall 26 would be engaged by the rounded mouth 23 at the end wall of the pocket 21 as shown in Figs. 16 and 17, and upset radially inwardly in supplementation to the upset of adjoining side walls. Thereafter, the completed wheel body would have its spoke ends at least and perhaps the entire body normalized, that is to say, annealed or semi-annealed to relieve any undue strains. In fact, I contemplate that such a step may always be added to those already described in connection with Figs. 1 to 14 to generally improve the product.

I conceive that there will be some wheels in which the spokes do not have end walls but in which the ends are open, in which case the step of the method illustrated in Figs. 12 to 14 and perhaps also that illustrated in Figs. 9 to 11 may be omitted from the series of Figs. 1 to 14, the turning up of the margins 16 according to the step illustrated in Figs. 7 and 8 being entirely sufficient to give the wheels a final dimension. Likewise I conceive some cases where due to the nature of the metal employed to make the wheel and to peculiar contours and depths of draw, the wheel may be drawn to full depth of section in the operation of Figs. 2 to 4 and therefore the operations of Figs. 7 and 8 may be in part or in whole eliminated from the series of Figs. 1 to 14.

Particularly, I conceive in further modification of my invention that even in cases where the end walls of the spokes are omitted and the spoke cross sections become open ended, that each and all the steps of my invention as outlined in Figs. 1 to 14 may be of advantage and practiced upon such spoke body with open ended spokes with great benefit. Particularly is this true of the upsetting operation of Figs. 12 to 14, since by this means the walls adjoining the ends of the spokes may be sized and thickened and the extremities of the spokes squared up, given sharp corners and conformed precisely to the ultimate circle 20, through which they are properly fitted to the rim of the wheel. In such practice there may be but one draw to full depth with or without oversized ends. If the over-sized ends are omitted, then the side walls of the spokes are constituted slightly deeper than necessary whereby the final upsetting operation of Figs. 12 to 14 reduces them to proper depth, utilizing the excess metal for the thickening and sizing. If multiple drawing operations are utilized as illustrated in Figs. 2 to 8, the side walls may similarly be made of excess depth irrespective of whether they are bulged out as at 13 or not, thereby providing the excess metal for the upsetting operation. A further alternative is the utilization both of the bulge 13 and of excess depth in an open ended spoke, and this irrespective of whether the drawing operations are single or multiple.

One of these open ended spokes is shown in Fig. 21 and its sized and thickened side walls are shown.

The form of spoke end produced may be varied within extremely wide ranges. I have shown one such variation in Fig. 18. Here the sharpened corners project beyond the end and side walls and the inner angles are filleted, improving both appearance and strength at the corners.

Certain it is that in the face of the many modifications indicated, the generic spirit of my invention entitles me to a commensurate protection irrespective of the circumstantial terminology of the specification and the annexed claims.

What I claim as new and useful and desire to protect by Letters Patent is:—

1. The method of forming artillery type wheels from flat stock sheet metal which consists in initially pressing out the bodies of the spokes with oversized ends and thereafter upsetting the ends.

2. The method of forming artillery type wheels from flat stock sheet metal which consists in initially pressing out the bodies of the spokes with oversized closed ends having rounded corners and thereafter upsetting said ends to square the corners.

3. The method of forming artillery type wheels from flat stock sheet metal which consists in initially axially pressing out the bodies of the spokes with oversized closed ends having rounded corners and thereafter upsetting said closed ends to reduce them to size and square the corners.

4. The method of sizing the ends of artillery steel wheel bodies to fit the rims thereof which consists in first forming the nave and spoke portions by drawing a flat sheet metal blank in a direction normal to the plane of the blank with the spoke ends oversize and then upsetting the walls of the spokes in the vicinity of their ends.

5. The method of sizing the ends of artillery steel wheel bodies to fit the rims thereof which consists in first forming the nave and spoke portions by drawing a flat sheet metal blank in a direction normal to the plane of the blank with the spoke ends over-size and then upsetting the walls of the spokes in the vicinity of their ends by an upsetting operation directed axially of the wheel body.

6. The method of fabricating a stamped metal artillery wheel spider, the nave and radially projecting spoke portions of which spider are integrally joined together at the nave portion, which comprises utilizing a drawing operation directed axially of the ultimate spider body to draw the nave and spoke portions to a depth of spoke portions less than the ultimate depth of cross section thereof in the completed product leaving metal undrawn to spoke portion cross section projecting flange-like in the plane of the spider from the side walls and from the spoke ends of the incomplete cross sections of the spoke portions, said flange-like projecting metal left on the margins of the partially formed spoke cross sections after the initial drawing operation extending all the way around the ends of the spokes from one side of the spoke to the other, the spoke end extremities of the spokes in the initial drawing operation being formed with end walls of an area in excess of the area of the walls of the ultimate spoke end contour of the completed wheel, and thereafter turning such projecting metal across the spider plane to complete the cross section of the spoke portions and reduce the area of the end walls of the spoke ends.

7. The method of forming artillery type wheels from flat stock sheet metal which consists in initially pressing out the bodies of the spokes with their individual spoke end portions and thereafter upsetting the ends.

8. The method of forming artillery type wheels from flat stock sheet metal which consists in initially pressing out the bodies of the spokes with their individual closed spoke end portions having rounded corners and thereafter upsetting said ends.

9. The method of fabricating a stamped metal artillery wheel spider, the nave and radially projecting spoke portions of which spider are integrally joined together at the nave portion, which comprises utilizing a drawing operation directed axially of the ultimate spider body to draw the nave and spoke portions to a depth of spoke portions less than the ultimate depth of cross section thereof in the completed product leaving metal undrawn to spoke portion cross section projecting flange-like in the plane of the spider from the side walls and from the spoke ends of the incomplete cross sections of the spoke portions, said flange-like projecting metal left on the margins of the partially formed spoke cross sections after the initial drawing operation extending all the way around the ends of the spokes from one side of the spoke to the other and from one spoke to the other between the spokes, and thereafter turning such projecting metal across the spider plane to complete the cross section of the spoke portions.

10. The method of fabricating a stamped metal artillery wheel spider, the nave and radially projecting spoke portions of which spider are integrally joined together at the nave portion, which comprises utilizing a drawing operation directed axially of the ultimate spider body to draw the nave and spoke portions to a depth less than the ultimate depth of cross section thereof in the completed product leaving metal undrawn to spoke portion cross section projecting flange-like in the plane of the spider from the side walls and from the spoke ends of the incomplete cross sections of the spoke portions, and thereafter turning such projecting metal across the spider plane to shape said initially partly drawn spokes to final contour.

11. The method of forming artillery type wheels from flat stock sheet metal which consists in initially pressing out the bodies of the spokes with their individual spoke end portions and the bodies of the spokes and their end portions in part at least as so pressed out lying in a position axially removed from that trans-axial plane which they should occupy in the completed wheel, and thereafter translating said axially removed portions of the spoke bodies and spoke ends to those trans-axial positions which they should occupy in the completed wheel.

12. The method of forming artillery type wheels from flat stock sheet metal which consists in initially pressing out the bodies of the spokes with their individual spoke end portions leaving said spoke bodies and ends with marginal flanged portions which lie axially removed from those trans-axial positions which they should occupy in the completed wheel, and thereafter translating said axially removed portions of the spoke bodies and spoke ends to those trans-axial positions which they should occupy in the completed wheel.

FRANKLIN R. HIGHT.